United States Patent
Sauermann et al.

(10) Patent No.: US 7,222,308 B2
(45) Date of Patent: May 22, 2007

(54) SLIDER BAR SCALING IN A GRAPHICAL USER INTERFACE

(75) Inventors: Volker Sauermann, Heidelberg (DE); Axel Von Bergen, Wiesloch (DE); Arne Schwarz, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 584 days.

(21) Appl. No.: 10/208,185

(22) Filed: Jul. 31, 2002

(65) Prior Publication Data
US 2004/0021695 A1 Feb. 5, 2004

(51) Int. Cl.
*G06T 11/20* (2006.01)
*G06F 3/033* (2006.01)
*G06F 3/048* (2006.01)

(52) U.S. Cl. ...................... 715/833; 715/800; 715/801; 345/440

(58) Field of Classification Search ................ 715/833, 715/853, 781, 769, 800, 801; 707/104; 345/440
See application file for complete search history.

(56) References Cited

U.S. PATENT DOCUMENTS

| | | | |
|---|---|---|---|
| 4,698,624 A | | 10/1987 | Barker et al. |
| 5,136,690 A | * | 8/1992 | Becker et al. .............. 715/853 |
| 5,615,347 A | * | 3/1997 | Davis et al. ................ 715/833 |
| 5,682,489 A | * | 10/1997 | Harrow et al. .............. 715/839 |
| 5,850,531 A | * | 12/1998 | Cox et al. ................... 715/781 |
| 6,460,049 B1 | * | 10/2002 | Becker et al. ........... 707/104.1 |
| 6,512,530 B1 | * | 1/2003 | Rzepkowski et al. ....... 715/833 |
| 6,614,456 B1 | * | 9/2003 | Rzepkowski et al. ....... 715/833 |
| 6,877,015 B1 | * | 4/2005 | Kilgore et al. .......... 707/104.1 |

OTHER PUBLICATIONS

"About Charts," Microsoft Excel Documentation, v9.0.3821 SR-1, Jun. 2002, 42 pgs.

* cited by examiner

*Primary Examiner*—Raymond J. Bayerl
*Assistant Examiner*—Namitha Pillai
(74) *Attorney, Agent, or Firm*—Fish & Richardson P.C.

(57) ABSTRACT

A graphical user interface element for modifying parameters of a graphing widget includes a first slider bar with a first slider control operable to adjust a first parameter of a graphing widget, and a second slider bar with a second slider control operable to adjust a second parameter of the graphing widget. The parameters may be modified to adjust the a graphical representation of data displayed by the graphing widget.

8 Claims, 5 Drawing Sheets

SLIDER BAR SCALING IN A GRAPHICAL USER INTERFACE

TECHNICAL FIELD

This invention is directed to an element for use in graphical user interfaces, and more particularly, to a slider bar element for controlling the graphical display of data.

BACKGROUND

A graphical user interface (GUI) is an interface to a computer software application that takes advantage of graphical capabilities of computer systems. A GUI typically includes various elements that display information to and/or receive input from a user. GUI elements are sometimes referred to as widgets and may include custom user interface components or standard components such as, for example, scroll bars, push buttons, check boxes, radio buttons, and text panes. Most computer software applications available today provide GUIs to efficiently interact with users.

GUIs are particularly useful in displaying graphical representations of data. For example, a table of numbers may be displayed graphically using various techniques including bar charts, scatter plots, and line graphs. These graphical representations assist users in visualizing the data to more easily recognize trends and analyze patterns within the data. Because plotting and charting data is a recurring task in GUI design, graphing widgets have been created to provide an easy mechanism to incorporate graphing functionality into a software application.

In an enterprise application storing various business data, it may be desirable to present graphical displays of the data. A graphing widget may be used to create and display bar charts or any other chart corresponding to the business data. For example, a business that distributes bulk mailings may have extensive mailing lists stored in an enterprise application. To better understand customers on the mailing lists, it may be desirable to view graphical depictions of various data using a graphing widget. For example, the business data may include the birth date of each customer on the mailing lists. To better understand customer demographics, a user may view a bar graph of the birth dates with each year shown on the horizontal axis and the number of customers born in that year shown on the vertical axis. A graphing widget typically calculates a default scale for the bar graph based on the minimum and maximum values so that all of the data may be viewed on the graph at one time.

Sometimes the scale of a graph or chart makes the data difficult to analyze, particularly when there are great differences between values in a dimension of the graph or chart. Consider for example, a bar graph illustrating the number of customers within a given country. If 95% of the customers are from a single country, then a bar chart showing the countries versus the number of customers in each country would include one very large bar and possibly many smaller bars. In such a graph, the vertical scale typically is sized such that the large bar representing 95% of the customers will fit on the screen. The remaining bars in the bar graph are substantially smaller, making it difficult to view any variations between them. One remedy to this problem is to rescale the bar graph to increase the variations between bars in the graph. Graphing widgets may include a window that allows a user to adjust various display parameters including the horizontal and vertical scales, and the minimum and maximum values. By modifying the scales, minimums, and maximums, a user may optimize the visual graphical display to best illustrate various characteristics of the data.

SUMMARY

In one general aspect, a graphical user interface element for modifying parameters of a graphing widget includes a first slider bar with a first slider control operable to adjust a first parameter of a graphing widget, and a second slider bar with a second slider control operable to adjust a second parameter of the graphing widget.

In some implementations, the graphing widget includes a minimum value parameter and a maximum value parameter. The first parameter is the maximum value parameter and the second parameter is the minimum value parameter. The graphing widget may display a graphical depiction of data, such as a bar chart or line graph.

The first parameter may be switched to the minimum value parameter and the second parameter switched to the maximum value parameter if the minimum value parameter is adjusted to a value greater than the maximum value parameter or if the maximum value parameter is adjusted to a value less than the minimum value parameter. The first slider bar and the second slider bar may be substantially the same size.

In another general aspect, a data analysis tool includes a data input mechanism operable to receive data to be analyzed, and a graphing widget operable to create a graphical representation of data received by the data input mechanism. The graphing widget includes a first slider bar including a first slider control operable to adjust a first parameter of a graphing widget, and a second slider bar including a second slider control operable to adjust a second parameter of the graphing widget.

In another general aspect, a data analysis tool includes a data input mechanism operable to receive data to be analyzed, a graphing widget operable to create a graphical representation of data received by the data input mechanism, and a slider bar user interface element with a slider control operable to adjust a parameter of a graphing widget.

The details of one or more implementations are set forth in the accompanying drawings and the description below. Other features and advantages will be apparent from the description and drawings, and from the claims.

DETAILED DESCRIPTION

Figure 1:
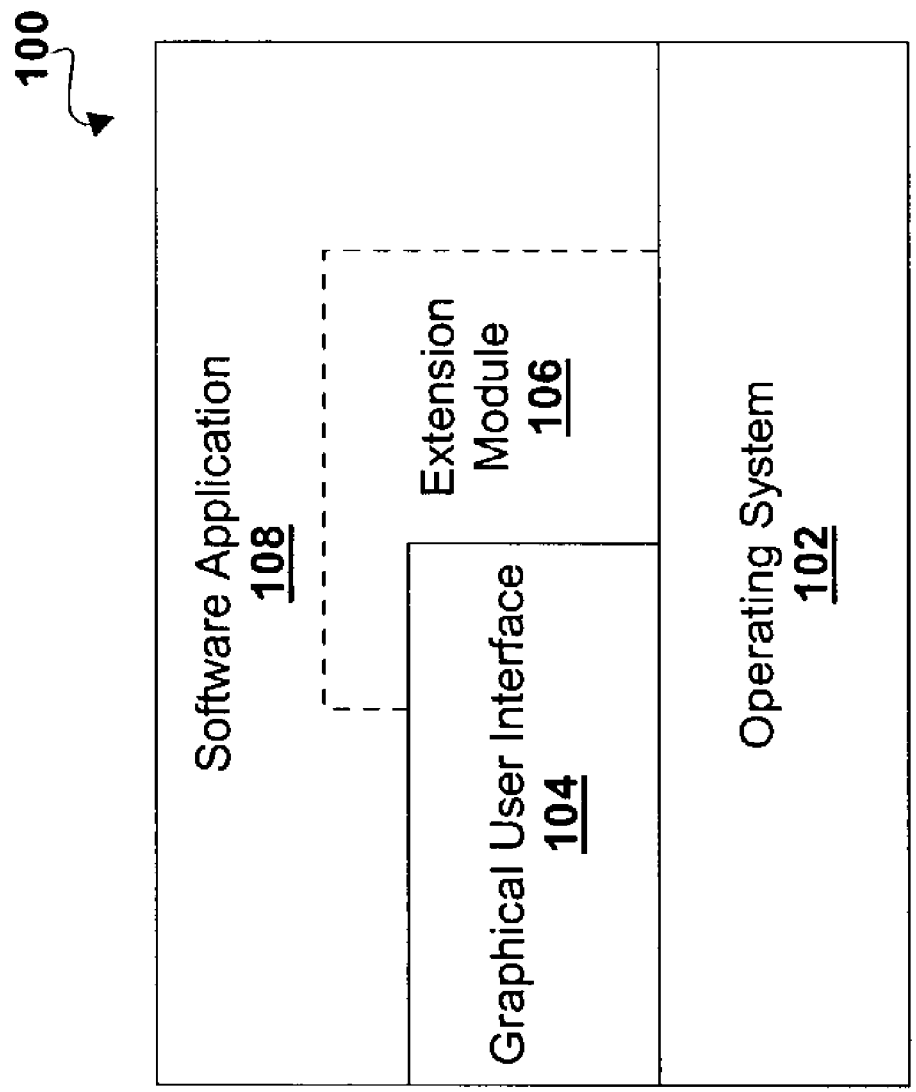
FIG. 1 is a block diagram of a software system using a graphical user interface (GUI) providing a slider bar scaling element.

Referring to FIG. 1, software environment I 00 includes an operating system 102 providing an interface to hardware input and output devices such as, for example, a keyboard, mouse, printer, display, and network. A graphical user interface (GUI) module 104 provides a library of routines used to implement a GUI. A GUI module 104 also may be provided as part of operating system 102. For example, Microsoft Windows is sold as an operating system; however, it includes an operating system 102 and a GUI module 104. The software environment 100 may include various libraries or extension modules 106 that may be used by a software application 108. In this example, the GUI module 104 uses the underlying operating system 102 to provide a graphical interface for software application 108. Software application 108 also may use the operating system 102, the GUI module 104, and extensions provided by extension module 106. For example, GUI module 104 may include a graphing widget to make it easy to incorporate graphing functionality into software application 108. Further extensions to the operating system 102 and/or the GUT module 104 may be provided by extension module 106. For example, the graphing widget may be extended to provide a vertical slider bar to facilitate modification of the vertical axis scale of the graphing widget. This extension is provided by extension module 106 which uses the underlying graphing widget of the GUI module 104 and the operating system 102.

Figure 2:
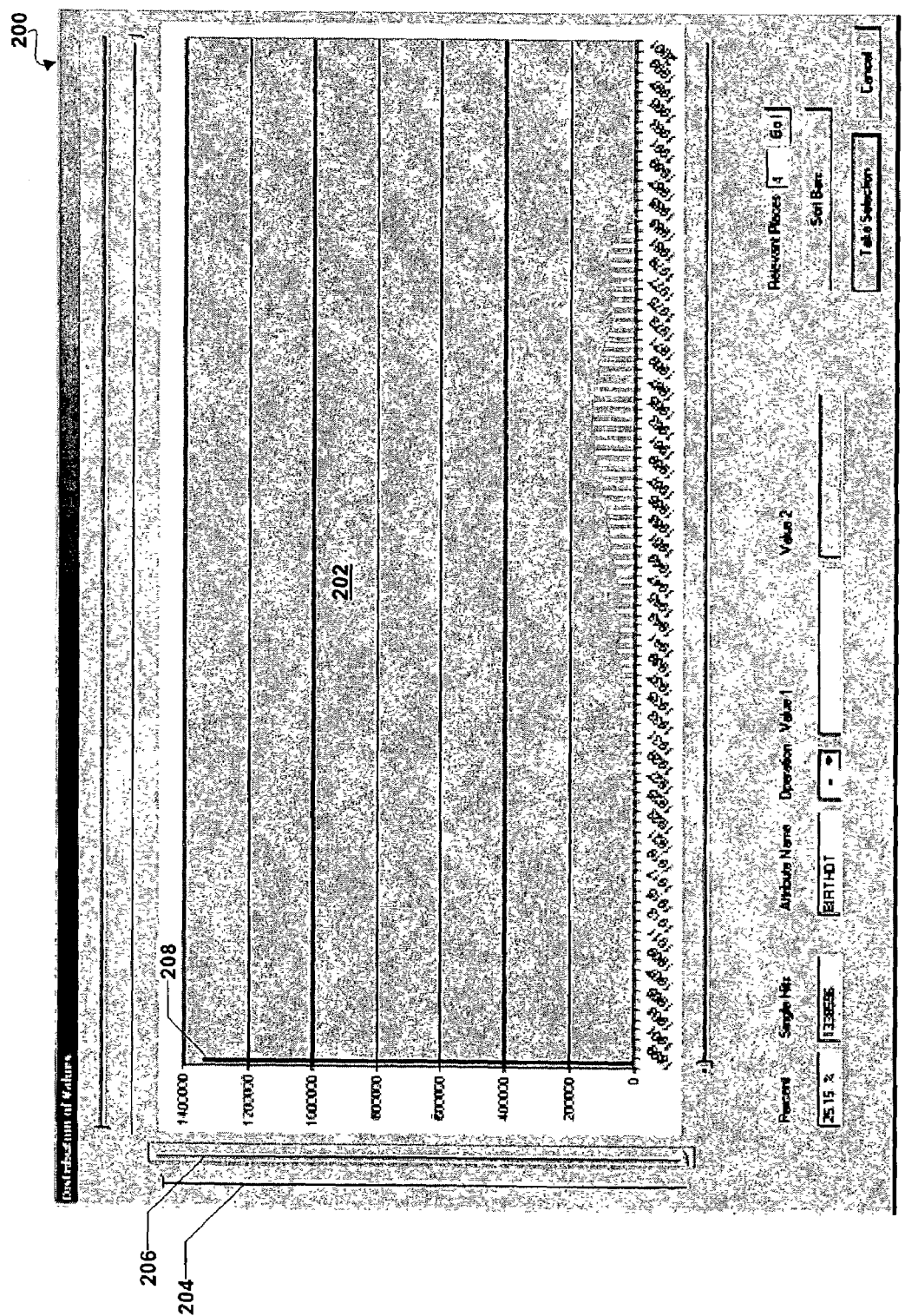
FIG. 2 is a screenshot of a GUI displaying a bar graph with a slider bar scaling element.

Referring to FIG. 2, a software application provides a GUI 200 to display a bar chart 202. In this example, the bar chart 202 is displaying information from a customer database. The x-axis displays the birth year for each customer in the database and the y-axis displays the number of customers having the corresponding birth year. Sliders 204 and 206 may be used to adjust parameters of the bar chart 202 such as the scale, minimum, and/or maximum values.

In the example shown in FIG. 2, the customer data does not include valid birth years for every customer. This information is typically requested of the customer through a written or electronic form. Some customers may not wish to share their private information and may leave the field blank. In this example, bar 208 shows that 1,338,596 customer records include no birth date information, representing over 25% of all customer records in the database system. So that each bar may be displayed, the graphing widget 202 automatically scales the display to shown between 0 and 1,400,000 on the vertical axis. This allows each bar to be shown in its entirety; however, with the large scale, it is difficult to observe differences between the remaining data displayed by the graphing widget 202. The bar chart displayed by the graphing widget 202 may be resized through two mechanisms: (1) by adjusting the scale using slider bars 204 and/or 206; or (2) by using a parameter window to list and edit various parameters of the bar chart.

Figure 3:
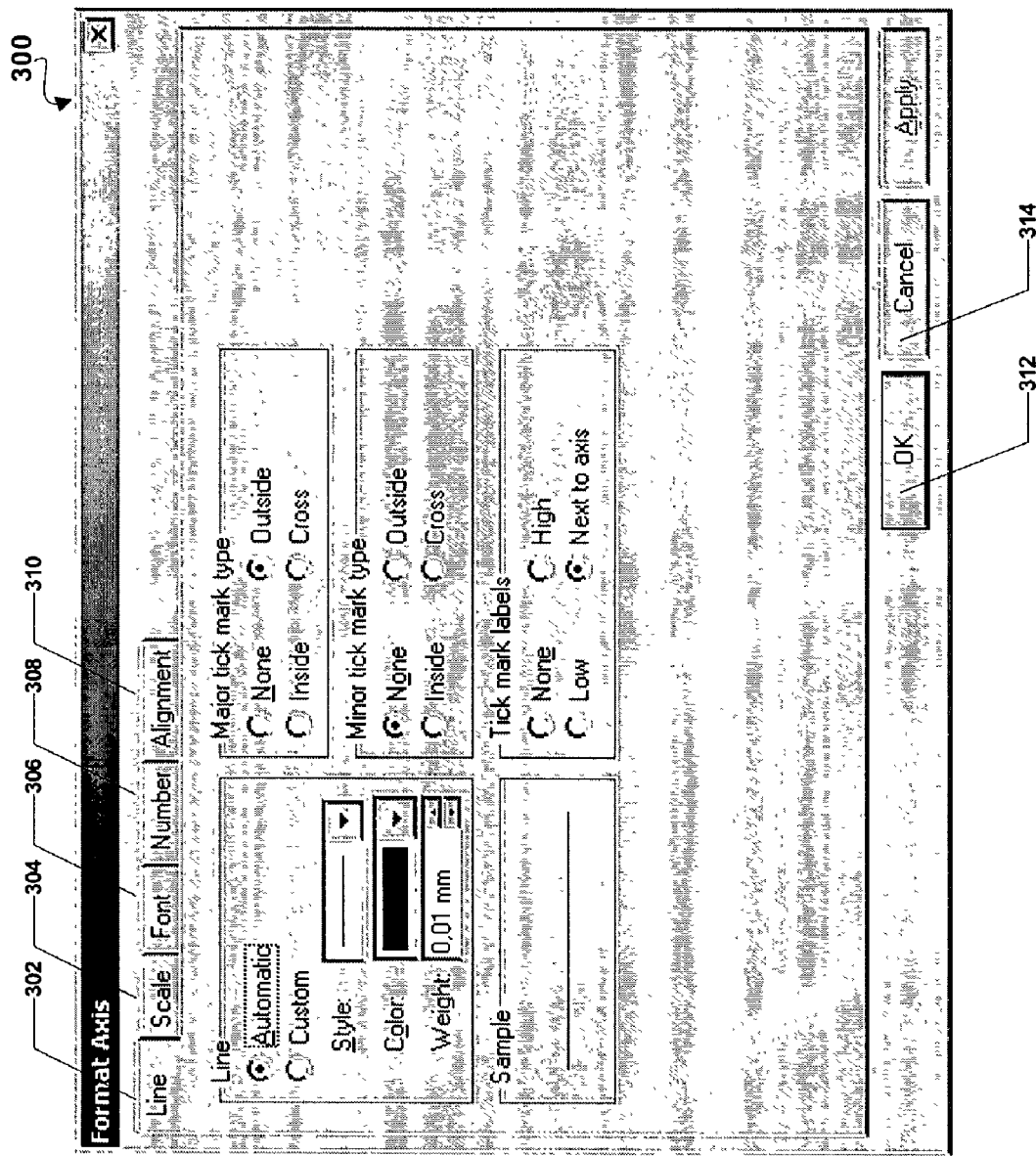
FIG. 3. is a screenshot of a GUI for modifying display parameters of a graphing widget.

Referring to FIG 3, a parameter GUI 300 allows a user to edit various parameters of the graphing widget 202 using a user interface. The user may select a line pane 302, a scale pane 304, a font pane 306, a number pane 308, or an alignment pane 310 to change corresponding parameters. When the user selects one of panes 302, 304, 306, 308, or 310, the display is updated accordingly to provide the corresponding options such as that shown for line pane 302 in FIG 3. To update the vertical scale, the user selects the scale pane 304. When the user is done editing parameters of the graphing widget 202, the user may press the OK button 312 to acknowledge the changes and exit the parameter GUI 300. On the other hand, the user may press the Cancel button 314 to undo changes and exit the parameter GUI 300.

Figure 4:
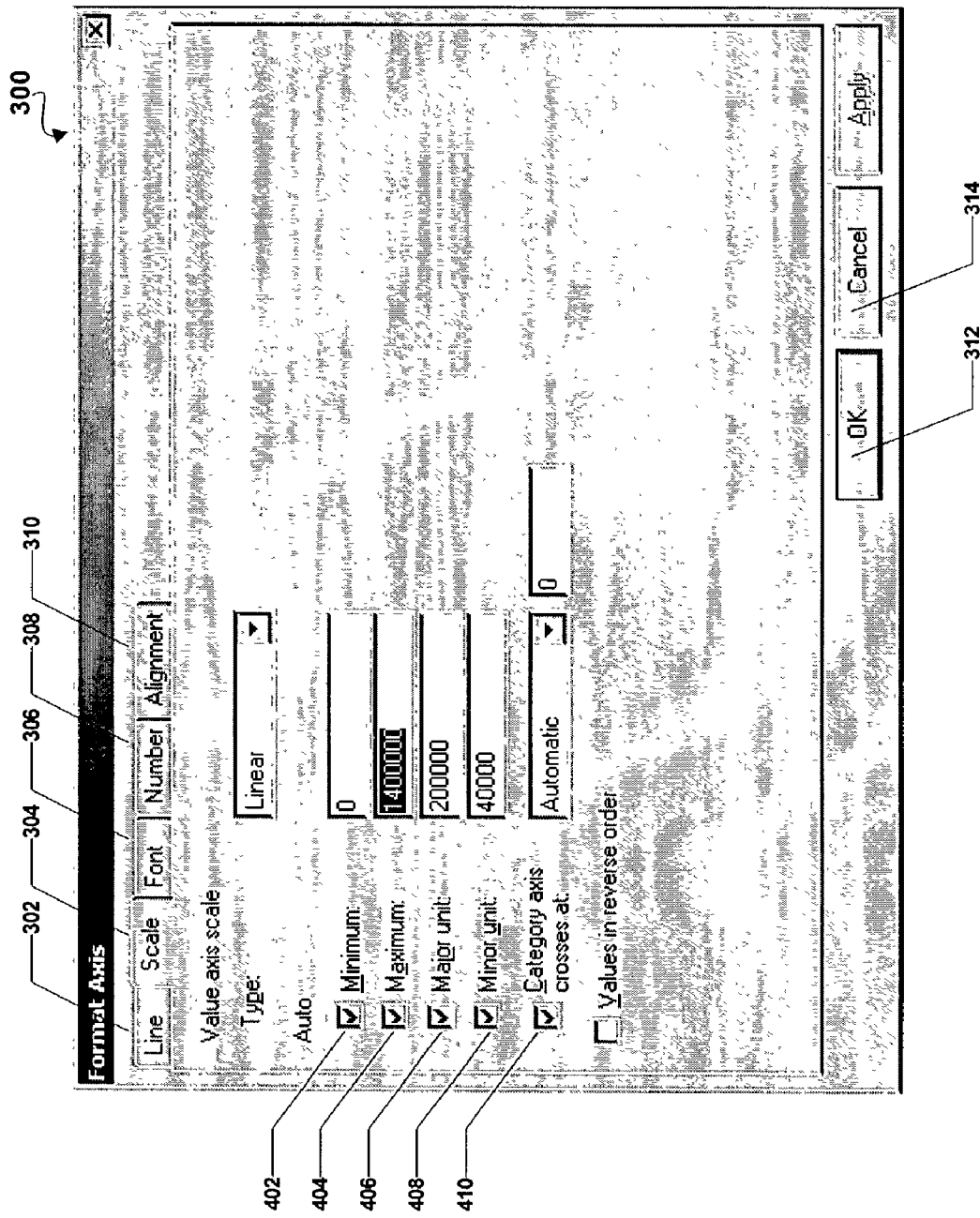
FIG. 4 is a screenshot of a GUI for modifying the scale of a chart or graph displayed by a graphing widget.

Referring to FIG. 4, when the user selects the scale pane 304, the parameter GUI 300 is updated to allow the user to update various parameters of the graph or chart displayed by the graphing widget 202. For example, the user can select the minimum value 402 and maximum value 404 of the vertical axis. These values determine the scale as well as the starting point for the display. For example, if a displayed bar chart is 100 pixels tall with the minimum value 402 set to 0 and the maximum value 404 set to 10000, then each pixel represents 100. On the other hand, if the maximum value is lowered to 1000, then each pixel is scaled to represent only 10. Similarly, the user may set the major unit 406, the minor unit 408, and the crossing point of the category axis using the parameter GUI 300.

Figure 5:
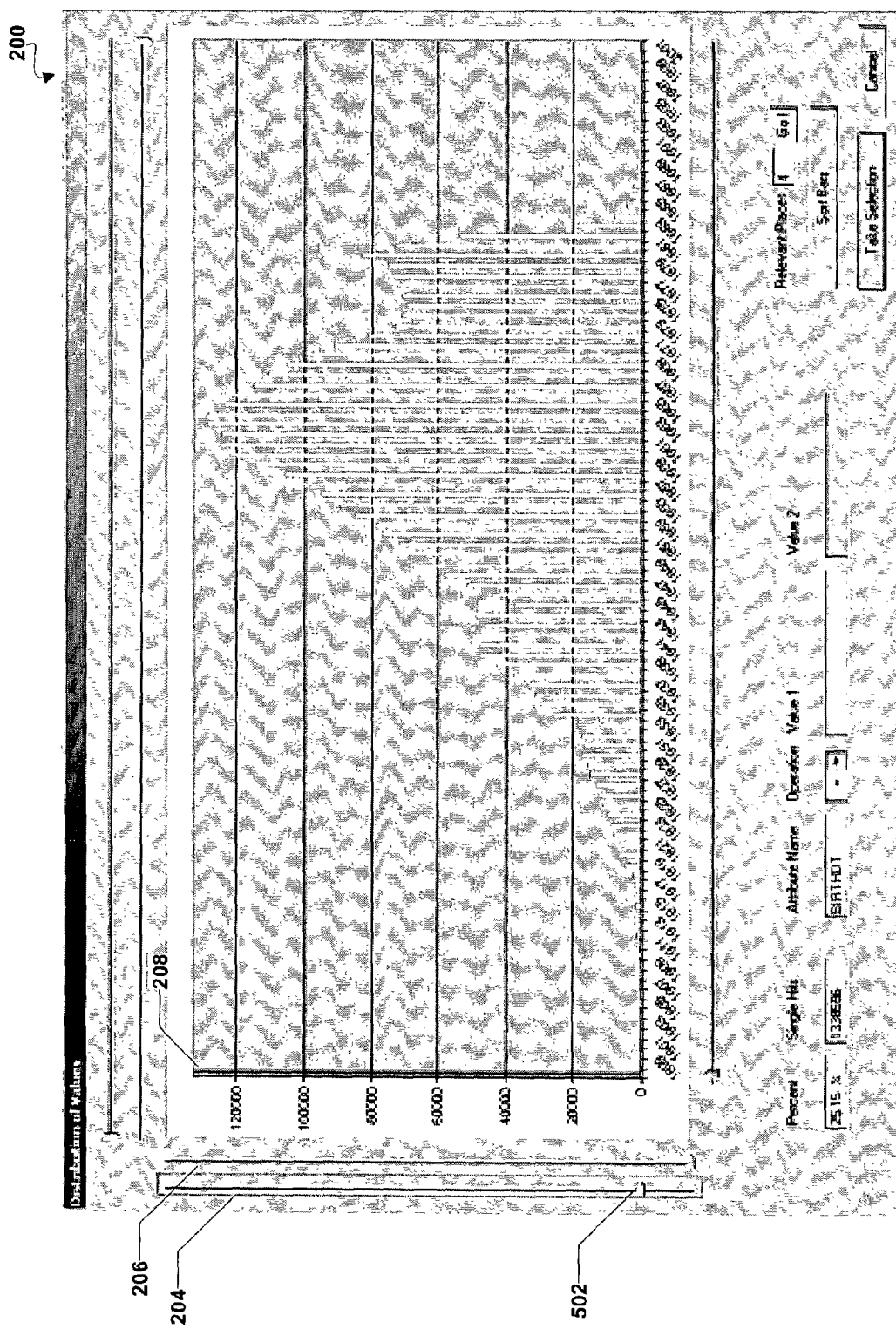
FIG. 5 is a screenshot of the GUI of FIG. 2 after the vertical scale has been modified using a slider bar scaling element.

Referring to FIG. 5, the bar chart shown in FIG. 2 may be rescaled to better illustrate the remaining data by setting the maximum value 404 to approximately 130,000. This may be done through the parameter GUI 300 or by using slider bars 204 and 206. In some implementations, the slider bar 204 is initially set in the topmost position as shown in FIG. 2. The user may actuate the slider by selecting the slider control 502 and moving it along the slider bar 204. As the slider control 502 moves down the slider bar 204, the maximum value 404 is reduced accordingly For example, if the slider control 502 is set to the very bottom of slider bar 204, the maximum value 404 is set to 0.

In the example shown in FIG. 5, the slider control 502 is lowered from the top of slider bar 204 until the maximum value 404 is set so as to best display the bars other than bar 208. With the maximum value 404 set to approximately 130,000, bar 208 extends the complete height of the displayed bar chart. The portions from 130,000 to 1,338,596 extend past the limits of the display and are therefore not shown.

Slider bar 204 may operate independently or in conjunction with a second slider bar 206. When dual slider bars are used, the slider control of slider bar 206 is initially set at the bottom. As the slider control is raised, the minimum value 402 is raised accordingly. In setting the minimum value 402 and maximum value 404 of a displayed graph, the minimum value 402 may be kept from growing larger than the maximum value 404 by swapping the functionality of the two slider bars 204 and 206 when their slider controls cross one another. For example, if slider bar 204 is initially set at the top and slider bar 206 is initially set to the bottom, then actuating slider bar 204 controls the maximum value 404 and actuating slider bar 206 controls the minimum value 402. If slider bar 204 is lowered and slider bar 206 is raised such that their slider controls cross one another, then their functionally may be switched such that slider bar 204 controls the minimum value 402 and slider bar 206 controls the maximum value 404.

The slider bars 204 and 206 may be implemented in a software module, such as, for example, a GUI module 104 or an extension module 106. The slider bars 204 and 206 may be implemented using a conventional slider bar widget that is configured to update the maximum value 404 and/or minimum value 402 whenever the slider bar widget is actuated.

In some implementations, the graphing widget 202 includes a minimum value 402; however, instead of a maximum value 404, the graphing widget 202 includes a scale parameter. In such an implementation, the slider bars 204 and 206 behave similarly; however, instead of modifying the maximum value 404, the corresponding slider bar 204 or 206 modifies the scale.

Slider bars 204 and 206 allow a user to manipulate display characteristics of a graphical chart or graph without using a separate parameter GUI 300. This technique may be used in any GUI where it is desirable to allow a user to manipulate the scale of a displayed graph, chart, or other graphical representation. For example, a web-based application may allow a user to view historic stock prices graphically displayed. A Java application may be provided to retrieve the historic data across the Internet and draw a chart on the user's screen to display the data. The Java application may use a slider parameter adjustment element such as that described above so that the user may easily adjust the vertical scale of the displayed historic stock prices. The initial historic stock price graph is scaled such that all historic stock prices fit within the displayed region. Two slider bars 204 and 206 are provided such that the user may adjust the vertical scale. As the upper most slider control is moved, the maximum stock price displayed is adjusted accordingly. Similarly, when the lower most slider control is moved, the minimum stock price displayed is adjusted accordingly.

The operation of the slider mechanism is independent of the type of scale used by the graphing widget 202. For example, a historic stock price graph may use a logarithmic scale instead of a linear scale. Regardless, the slider mechanism may update the minimum value 402 and maximum value 404 in the same manner.

A number of implementations have been described. Nevertheless, it will be understood that various modifications may be made without departing from the spirit and scope of the invention. Accordingly, other implementations are within the scope of the following claims.

What is claimed is:

1. A graphical user interface element for modifying parameters of a graphing widget, the element comprising:
   a first slider bar including a first slider control operable to adjust a first parameter of the graphing widget; and
   a second slider bar including a second slider control operable to adjust a second parameter of the graphing widget,
   wherein:
      the graphing widget includes a minimum value parameter and a maximum value parameter,
      the first parameter is the maximum value parameter and the second parameter is the minimum value parameter, and
      the first parameter switches to the minimum value parameter and the second parameter switches to the maximum value parameter if the minimum value parameter is adjusted to a value greater than the maximum value parameter or the maximum value parameter is adjusted to a value less than the minimum value parameter.

2. The graphical user interface element of claim 1 wherein the graphing widget displays a bar chart.

3. The graphical user interface element of claim 1 wherein the graphing widget displays a line graph.

4. The graphical user interface element of claim 1 wherein the first slider bar and the second slider bar are substantially the same size.

5. A data analysis tool comprising:
   a data input mechanism operable to receive data to be analyzed; and
   a graphing widget operable to create a graphical representation of data received by the data input mechanism, the graphing widget comprising:
      a first slider bar including a first slider control operable to adjust a first parameter of the graphing widget; and
      a second slider bar including a second slider control operable to adjust a second parameter of the graphing widget,
   wherein:
      the first and second parameters of the graphing widget include display characteristics that affect how said received data displayed by the graphing widget is resealed,
      the graphing widget includes a minimum value parameter and a maximum value parameter,
      the first parameter is the maximum value parameter and the second parameter is the minimum value parameter, and
      the first parameter switches to the minimum value parameter and the second parameter switches to the maximum value parameter if the minimum value parameter is adjusted to a value greater than the maximum value parameter or the maximum value parameter is adjusted to a value less than the minimum value parameter.

6. The data analysis tool of claim 5 wherein the graphing widget displays a bar chart.

7. The data analysis tool of claim 5 wherein the graphing widget displays a line graph.

8. The data analysis tool of claim 5 wherein the first slider bar and the second slider bar are substantially the same size.

* * * * *